(12) United States Patent
Jakobsson

(10) Patent No.: US 11,874,721 B2
(45) Date of Patent: Jan. 16, 2024

(54) POWER MANAGEMENT IN PROCESSING CIRCUITRY WHICH IMPLEMENTS A NEURAL NETWORK

(71) Applicant: Axis AB, Lund (SE)

(72) Inventor: Anton Jakobsson, Lund (SE)

(73) Assignee: AXIS AB, Lund (SE)

( * ) Notice: Subject to any disclaimer, the term of this patent is extended or adjusted under 35 U.S.C. 154(b) by 23 days.

(21) Appl. No.: 17/863,094

(22) Filed: Jul. 12, 2022

(65) Prior Publication Data
US 2023/0065730 A1 Mar. 2, 2023

(30) Foreign Application Priority Data
Aug. 17, 2021 (EP) .................................. 21191587

(51) Int. Cl.
*G06F 1/00* (2006.01)
*G06F 1/324* (2019.01)
*G06F 1/20* (2006.01)

(52) U.S. Cl.
CPC .............. *G06F 1/324* (2013.01); *G06F 1/206* (2013.01)

(58) Field of Classification Search
CPC ........ G06F 1/324; G06F 1/206; G06F 1/3296; G06N 3/0464; G06N 3/063; Y02D 10/00
See application file for complete search history.

(56) References Cited

U.S. PATENT DOCUMENTS

| | | | |
|---|---|---|---|
| 6,081,901 | A | 6/2000 | Dewa et al. |
| 8,805,764 | B1 | 8/2014 | Rhines et al. |
| 2002/0171603 | A1* | 11/2002 | Chen .................. G06F 1/324 345/1.1 |
| 2005/0050373 | A1 | 3/2005 | Orenstien et al. |
| 2016/0054774 | A1 | 2/2016 | Song et al. |
| 2019/0187775 | A1 | 6/2019 | Roten et al. |
| 2019/0354159 | A1 | 11/2019 | Liu et al. |
| 2019/0370086 | A1 | 12/2019 | Heilper et al. |

(Continued)

FOREIGN PATENT DOCUMENTS

| | | |
|---|---|---|
| CN | 109491494 A | 3/2019 |
| WO | 2012/058202 A1 | 5/2012 |

(Continued)

OTHER PUBLICATIONS

Extended European Search Report dated May 10, 2022 for European Patent Application No. 21191587.1.

(Continued)

*Primary Examiner* — Nitin C Patel
(74) *Attorney, Agent, or Firm* — Volpe Koenig

(57) ABSTRACT

A method of operating a hardware accelerator comprises: implementing a multi-layer neural network using the hardware accelerator; measuring a power consumption of the hardware accelerator while executing a predefined operation on the multi-layer network at a default clock frequency; evaluating one or more power management criteria for the measured power consumption; and, in response to exceeding one of the power management criteria, deciding to reduce the clock frequency relative to the default clock frequency. In the step of measuring a power consumption of the hardware accelerator, per-layer measurements which each relate to fewer than all layers of the neural network may be captured.

14 Claims, 4 Drawing Sheets

(56) References Cited

U.S. PATENT DOCUMENTS

2019/0384370 A1   12/2019  Kim et al.
2020/0272149 A1    8/2020  Yoo et al.
2020/0272371 A1    8/2020  Suzuki et al.

FOREIGN PATENT DOCUMENTS

WO    2021/014215 A1    1/2021
WO    2021/045676 A1    3/2021

OTHER PUBLICATIONS

Partial European Search Report dated Feb. 9, 2022 for European Patent Application No. 21191587.1.

Yao et al., "Evaluating and analyzing the energy efficiency of CNN inference on high-performance GPU," Concurrency and Computation: Practice and Experience. 33. 10.1002/cpe.6064 (2020).

Ha et al., "Layerwise Buffer Voltage Scaling for Energy-Efficient Convolutional Neural Network," in IEEE Transactions on Computer-Aided Design of Integrated Circuits and Systems, vol. 40, No. 1, pp. 1-10, (Jan. 2021).

Jiang et al., "Optimizing energy efficiency of CNN-based object detection with dynamic voltage and frequency scaling," Journal of Semiconductors, vol. 41, No. 2 (2020).

\* cited by examiner

POWER MANAGEMENT IN PROCESSING CIRCUITRY WHICH IMPLEMENTS A NEURAL NETWORK

FIELD OF INVENTION

The present disclosure relates to the field of processor technology. In particular, it proposes methods and devices for operating a hardware accelerator which implements a multi-layer neural network.

TECHNICAL BACKGROUND

As a rule, processing circuitry is not restricted to a single clock frequency but can function over a range of clock frequencies. When the processing circuitry is integrated in a chip or chipset, however, it is common practice to recommend a clock frequency significantly lower than the top of this range, one which is acceptable in view of the chip's ability to dissipate excess heat. The heat dissipation ability may be expressed as a peak cooling power or continuous cooling power. The recommended clock frequency, as specified by a manufacturer or integrator, effectively throttles the chip at a clock frequency for which the chip is certified to operate continuously without overheating. Overheating may cause erroneous output or even permanent damage. A chip operates continuously in this sense if it runs long enough for the chip to reach and maintain a steady-state operating temperature and if the cooling afforded by any intervening low-duty periods is negligible. Qualitatively, the recommended clock frequency may be determined on an assumption of full load or worst-case operation, which may be modelled by a predefined synthetic (or made-up) computational task. The final value of the recommended clock frequency may be fixed after deducting a desired safety margin. If premature component aging is a concern—this is known to be temperature-related—the recommended clock frequency may be set even lower.

Because the recommended clock frequency is directly related to the number of useful operations per unit time, safeguards of this manner certainly reduce incidents but tend to detract from the user experience while the chip or chipset is functioning (execution speed, responsiveness etc.) It is desirable, therefore, to base the clock frequency determination on insightful, accurate and well-balanced criteria. This is especially valid for artificial intelligence (AI) applications, including neural networks, whose implementations are oftentimes computationally demanding. Related challenges are handled in the field of dynamic voltage and frequency scaling (DVFS). DVFS techniques may include varying the clock frequency at runtime in view of load fluctuations. This is done in the interest of energy conservation, notably in battery-powered devices, and the avoidance of overheating.

US20190370086A1 discloses a DVFS method for power management in deep learning accelerator systems. A "power table" is established by having the accelerator execute an example workload, which includes both compute tasks and memory bandwidth tasks. At runtime, when the accelerator system is going to execute a utility workload, the power table is used to estimate the power consumption, so that power can be allocated dynamically to the accelerator system. The allocation may aim to achieve best performance subject to a power budget. The utility workload may be the implementation of a convolutional neural network.

SUMMARY

The present disclosure proposes methods and devices by which a hardware accelerator that implements a multi-layer neural network can be operated safely without unnecessary detriment to its delivered performance. Such methods and devices allow an individual hardware accelerator to adapt, at the time of deployment, to its production-related computational task with little or no need for testing, measurements and manual intervention. It is a particular object to propose such methods and devices that meet the technical requirements on a video surveillance application.

This is achieved by the present disclosure as defined by the independent claims. The dependent claims relate to advantageous embodiments of the disclosure.

In a first aspect of the disclosure, there is provided a method of operating a hardware accelerator. The method comprises implementing a multi-layer neural network using the hardware accelerator, measuring a power consumption of the hardware accelerator while executing a predefined operation on the multi-layer network at a default clock frequency, and evaluating one or more power management criteria for the measured power consumption. If one of the power management criteria is exceeded, it is decided to reduce the clock frequency relative to the default clock frequency.

In the terminology of the present disclosure, a "hardware accelerator" may refer to a chip or chipset which is suitable for assisting a central processing unit (CPU), and which offloads the CPU of some computational tasks or types of computational tasks. The hardware accelerator may include dedicated hardware and software optimized for this type of computational tasks. Generally speaking, and especially if dedicated hardware and software are used which are not of a general-purpose character, a hardware accelerator is not adapted to act as main processor, such as a CPU in a computer. Example hardware accelerators are artificial-intelligence (AI) accelerators, graphic processing units (GPUs), field-programmable gate arrays (FPGAs) and application-specific integrated circuits (ASICs).

As the term "default clock frequency" is used in this disclosure, the hardware accelerator is expected to withstand continuous operation at the default clock frequency without producing an abnormal frequency of erroneous outputs and/or without abnormal degradation or permanent damage. The default clock frequency may be specified by a manufacturer or integrator, e.g., as part of a certification of compliance with a quality norm or standard. If the hardware accelerator is specified for continuous operation at any clock frequency in a range of frequencies, the default clock frequency may be understood to be the greatest frequency in this range. As explained initially, continuous operation may refer to operation sustained long enough that the hardware reaches and maintains a steady-state operating temperature, with only negligible cooling to occur in low-duty periods, if any. The default clock frequency may be independent of the composite system (e.g., system-on-chip, SoC) in which the hardware accelerator is to be included; for example, the default clock frequency need not have been determined in consideration of the expected processing tasks to be executed by the composite system. The default clock frequency is not synonymous with momentary or short-term peak clock frequency, at which the hardware accelerator may function for a limited time only, e.g., during intentional overclocking or when supported by supplementary cooling. The default clock frequency is also not to be confused with a recommended clock frequency that has been determined on the basis of a predefined ('default') computational task that corresponds to full load.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

An execution of the method according to first aspect of the present disclosure will trigger a reduction of the clock frequency of the hardware accelerator only if a power management criterion is exceeded. This avoids overly conservative throttling of the hardware accelerator. A further benefit is that the one or more power management criteria are evaluated on the basis of measurement data, and measurements may reflect the true technical state of the hardware accelerator more faithfully than a model-based simulation, a calculated estimate or the like. Further still, the predefined operation to be executed during the measurement is related to the multi-layer neural network and is therefore of immediate relevance to the actual computational task to be performed by the hardware accelerator under consideration. Unlike operation at full load, the measurement data thus obtained helps ensure safe operation of the hardware accelerator (e.g., controls the risk of overheating) without sacrificing a significant part of the accelerator's processing capacity, like in conventional worst-case oriented throttling. Indeed, a commercially available hardware accelerator model may have been designed as a general-purpose processor suitable for deployment in basically any system, and even a commercially available AI-optimized accelerator may have been designed in view of a broader—and possibly more demanding—class of neural networks. The inventor has realized that the load case, on which a decision to reduce or not reduce the clock frequency is to be based, may generate significantly less excess heat than the hardware accelerator's peak capacity.

In some embodiments of the method, a decision to reduce the clock frequency may be preceded by a further measurement of the power consumption, namely, while executing the predefined operation at a lower clock frequency than the default clock frequency. This may provide a greater certainty as to whether the lower clock frequency meets the power management criteria.

In some embodiments, the method further includes steps for determining a suitable drive voltage of the hardware accelerator. The drive voltage may be determined in view of performance indicator recorded during the execution of the predefined operation. This way, a desired performance can be achieved economically and with minimal wear on the circuitry.

In some embodiments, the predefined operation may optionally correspond to a plurality of per-layer sub-operations. This is to say, the predefined operation relating to the neural network as a whole may materialize as a first sub-operation relating to a first layer of the neural network and as a second, different sub-operation relating to a second layer.

In some embodiments, the power consumption measurements may be performed in a dedicated measurement phase, wherein the predefined operation is not production-related. Production refers generally to the utility task for which the hardware accelerator has been commissioned; it is not limited to activities which create or modify physical objects. In other embodiments, the measurements are performed at runtime, wherein the predefined operation is production-related (e.g., a utility operation). The production-related operation may be related to video surveillance, such as AI-assisted image processing or computer vision operations.

In a second aspect of the disclosure, there is provided a processor configured to control a hardware accelerator. The processor, which may be a CPU, may comprise a memory and processing circuitry configured to perform the above method.

The disclosure further relates to a computer program containing instructions for causing a computer to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical, or solid-state type. Still within the scope of "data carrier", such memories may be fixedly mounted or portable.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the disclosure are shown. These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

Figure 1:
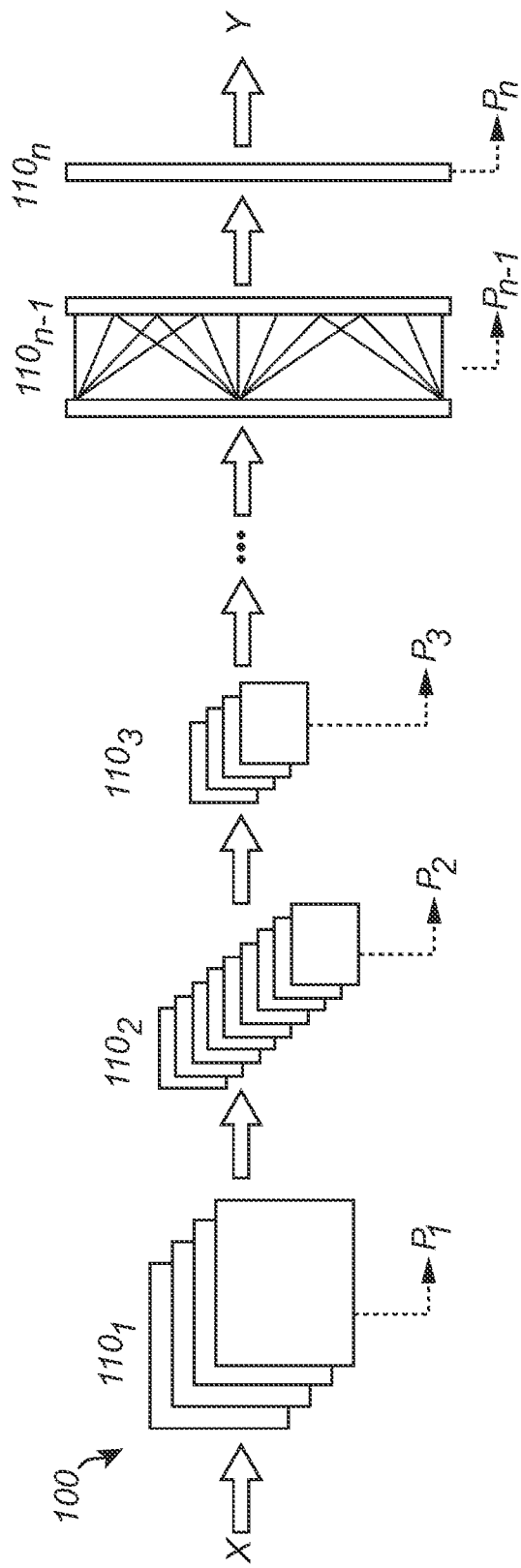
FIG. 1 is a schematic illustration of a multi-layer neural network, in which layer-wise power consumption measurements are performed.

FIG. 1 shows in conceptual form a neural network, exemplified as a convolutional neural network (CNN) 100 with n≥2 layers 110. Input data X is fed to the CNN 100 at the level of the first layer 110-1, and output data Y is read from the nth layer 110-n. A layer may be understood as a data structure which receives input information from an upstream layer, processes the information and then passes output information to a downstream layer. The input and output information for a layer 110 may be formatted as a tensor of predefined dimensions. The architecture of the CNN 100 normally does not permit passage of information between nonadjacent layers 110. It is normal, however, for each layer's 110 processing to include interaction among (such as mathematical operations involving) the different tensor elements, which means that the processing in the kth layer cannot always begin until the processing in the (k−1)th layer has ended. In FIG. 1, the first, second and third layers 110-1, 110-2, 110-3 are symbolically drawn as convolutional layers, between which one or more (maximum) pooling layers may optionally be interposed. The (n−1)th layer represents a fully connected layer, and the nth layer 110-n is a generic output layer. The second through (n−1)th layers may be hidden layers, which do not allow direct external data exchange.

It is emphasized that the sequence of layers 110 shown in FIG. 1 refers to the mathematical operations performed within the CNN 100 and need not reflect the physical architecture of the circuitry that implements the CNN 100. In particular, the hardware accelerator to be discussed next may have an entirely different architecture which is not necessarily organized as layers in a structural sense.

Figure 3:
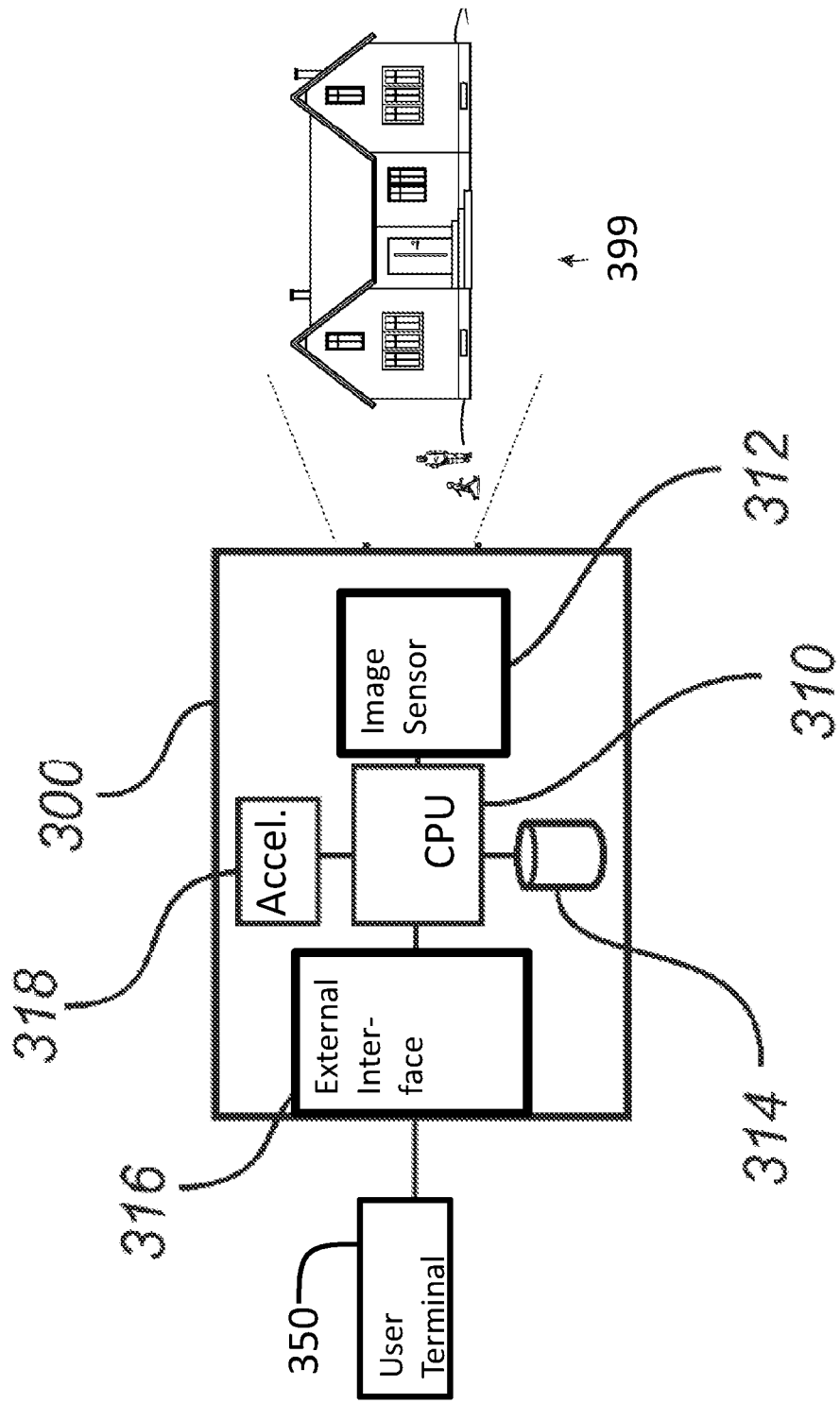
FIG. 3 shows a surveillance camera including a hardware accelerator.

FIG. 3 shows, among other things, a hardware accelerator 318 which implements a multi-layer neural network of the type illustrated in FIG. 1. In the example use case of FIG. 3, the hardware accelerator 318 is a component of a surveillance camera 300. In other use cases, the hardware accelerator 318 may be a component of a monitoring camera. It is understood that both types are digital cameras. An overall purpose of the surveillance camera 300 is to acquire (still or video) images of a scene 399 and to derive, from the images, output data of relevance to a user, such as quality-improved images, content-annotated images, purposefully cropped images, purposefully extracted segments of a video sequence, event notifications indicating the detected presence of a specific type of object or activity in the scene 399. For this purpose, the surveillance camera 300 additionally comprises a CPU 310, an image sensor 312, memory 314 and an external interface 316. An example topology of data connections among these components is drawn as solid lines. Alternatively, the surveillance camera 300 includes one or more data buses allowing a direct connection within each pair of components.

The CPU 310 has the main responsibility for deriving the relevant output data from the images—including image quality improvement, event and object recognition, content-oriented annotation, cropping, video segments extraction, as exemplified above—and may delegate at least a part of this processing to the hardware accelerator 318. Raw or pre-processed image data may be fed as input X to the neural network 100 and the desired output data may be obtained as output Y. The image sensor 312 may be adapted to sense visible or invisible light, such as infrared or ultra-violet light, or radiation at specific wavelengths suitable for detecting chemical substances with a corresponding emission or absorption spectrum. The memory 314, which may be divided into a volatile and a non-volatile portion may be adapted for storing software, configuration data, detection templates, historic image data and the like. The external interface 316 may be a wired or wireless general-purpose communication network interface. Its role is to make the surveillance camera's 300 output data available to a user and to receive configuration and maintenance information for modifying the operating status of the surveillance camera 300, as needed. In FIG. 1, the user side is symbolized by a user terminal 350, which may be deployed independently of the physical location of the surveillance camera 300, such as in a home or a control room.

It is not uncommon for the deployment of a surveillance camera to be justified by high economic or personal values at stake, so that the user community generally expect excellent operational reliability. The incidence of erroneous or missing (dropped) video frames must be very limited, namely, since the frames are not captured for ornamental or entertainment purposes but rather with the aim of discovering or documenting unwanted activity, ultimately to deter, stop or investigate such activity. Execution failures necessitating a full or partial reboot are expected to be very rare. Furthermore, the desire to centralize human involvement in the monitoring of a large number of locations to a single control room translates into a need to limit the bitrate of each surveillance camera's output data flow. To meet challenging bitrate restrictions, computationally intensive data compression, event detection and/or selective discarding of irrelevant image data may need to be implemented in the surveillance camera. The combination of these requirements has implications in particular for the hardware accelerator, which should be operated at a clock frequency high enough to sustain a desired frame rate, yet low enough to substantially eliminate the risk of overheating, frame losses, local voltage drop ('IR drop') and similar scenarios where surveillance data is irrevocably lost. Between these upper and lower limits, it is generally desirable to operate the hardware accelerator in the upper part of the range, at the highest possible workable clock frequency. At least some of these requirements specific to video surveillance can be adequately met using embodiments of the present disclosure.

Figure 2:
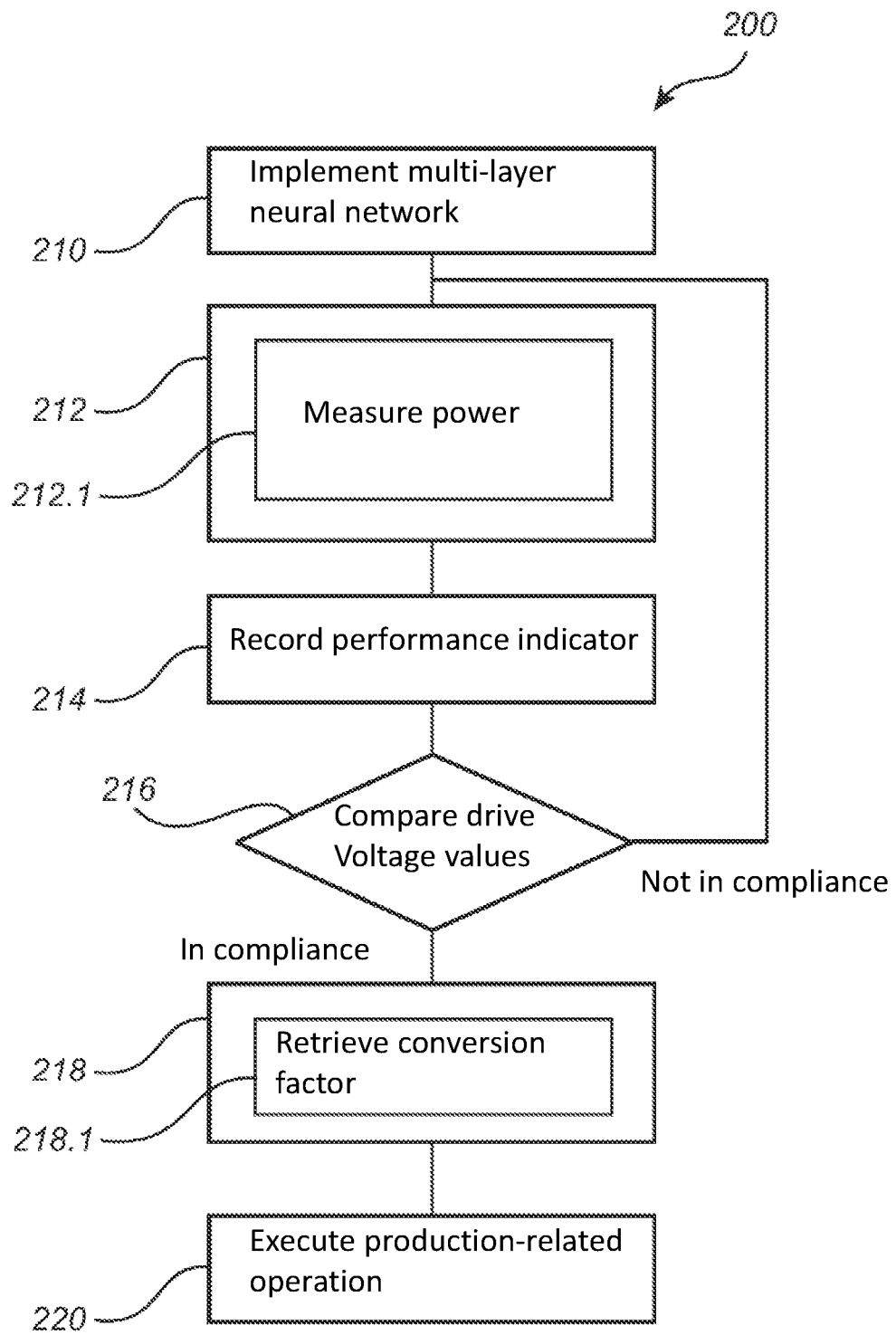
FIG. 2 is a flowchart of a method according to embodiments of the disclosure.

Turning to the flowchart in FIG. 2, a method 200 of operating a hardware accelerator 318 will now be described, in accordance with some embodiments of the present disclosure. The method 200 may be executed by a general-purpose processor, such as the CPU 310 in FIG. 3, that has access to certain measurement data relating to the power consumption of the hardware accelerator 318 and is authorized to make decisions regarding the clock frequency at which the hardware accelerator 318 is to operate.

In a first step 210 of the method 200, a multi-layer neural network 100 is implemented using the hardware accelerator 318. This may include substeps such as developing machine-executable instructions in accordance with the architecture of the neural network 100, combining software modules from a pre-developed library and/or making software available for execution by loading it into a runtime memory.

In a second step 212, the power consumption of the hardware accelerator 318 is measured while a predefined operation is executed on the multi-layer neural network 100 at a default clock frequency. The intended meaning of "default clock frequency" has been explained above. As also discussed in a previous section, the predefined operation relates to the implemented neural network 100: the predefined operation may be selected to correspond to the most power-consuming workload to be expected for that neural network 100. It need not correspond to the maximum workload in any neural network that the hardware accelerator 318 is able to implement, nor does it necessarily correspond to the maximum workload in an absolute sense, i.e., from the point of view of the very processing circuitry in the hardware accelerator 318.

The measurement 212 may be performed by means of per se known electric components for measuring the voltage and intensity of a current fed to the hardware accelerator 318 while the predefined operation is being executed, and optionally measuring a voltage current phase difference or a power factor. The predefined operation can be repeated as needed, to allow the electric quantities sufficient time to stabilize and/or allow multiple samples to be collected from which an accurate average is formed. The repetition should preferably be such that the density of operations per unit time, which is normally an indicator of the thermal power developed by the hardware accelerator, corresponds to the density prevailing during a single execution of the operation.

In some embodiments, the measurement 212 is a plurality of per-layer measurements $P_1, P_2, \ldots, P_{n-1}, P_n$, each relating to a single layer 110 or relating to a combination of layers 110 including fewer than all layers of the neural network 100. It is recalled that the predefined operation may correspond to a plurality of per-layer sub-operations. Then, unless the hardware accelerator 318 has a pipelining functionality with respect to the layers, the sub-operations relating to different layers 110 are performed sequentially in time, so that the per-layer measurements can be obtained by straightforward gating.

The third step 214 of the method 200 is optional and will be described below.

In a fourth step 216 of the method 200, one or more power management criteria for the measured power consumption are evaluated. The power management criteria may include a global power budget on momentary power, a global power budget on average power, a per-layer momentary power limit, a per-layer average power limit, a temperature limit or any combination of these. An implementer is free to choose from among these criteria, which each has its own advantages and potential drawbacks. For example, it may be advisable to apply a per-layer momentary power limit for a hardware accelerator that has delicate circuitry and/or a high cost of downtime. Conversely, a global power budget on average power may be the better option for running a sequence of speed-oriented tests on a prototype built from replaceable inexpensive components. A temperature limit $T_{max}$ may be evaluated by estimating the steady-state temperature which the hardware accelerator 318 will assume for the measured power consumption $P_1, P_2, \ldots, P_{n-1}, P_n$, e.g., using an approximate thermal model of the hardware accelerator 318. Alternatively, the temperature limit $T_{max}$ may be evaluated on the basis of a direct measurement by a temperature probe installed in the hardware accelerator 318.

In a fifth step 218, if it has been found that one or more of the power management criteria are exceeded, a decision to reduce the clock frequency down from the default clock frequency may be taken. Before such decision 218 can be made, a further measurement 212.1 at one or more alternative clock frequencies which are lower than the default clock frequency may optionally be carried out. This is indicated in the flowchart of FIG. 2 by the right-hand branch leaving the evaluation step 216 which joins the execution flow above step 212/212.1. If the measurement 212.1 and subsequent renewed evaluation 216 reveals that the hardware accelerator 318 operates in compliance with the power management criteria at the alternative clock frequency, the decision 218 to reduce the clock frequency down to the alternative clock frequency has a more solid underpinning. The measurements 212.1 at the one or more alternative clock frequencies lower than the default clock frequency can be performed before or after the measurement 212 at the default clock frequency, or both before and after that measurement 212. The further measurement 212.1 is not meaningful if, say, the hardware accelerator 318 can only operate at two clock frequency values, and step 212.1 is therefore an optional part of the method 200. It is recalled that, if there are multiple alternative frequencies for which the power management criteria are fulfilled, the greatest alternative frequency should be selected in the interest of maintaining as much as possible of the hardware accelerator's 318 performance. This avoids excessive throttling.

After step 218, where it has been decided whether to reduce the clock frequency, the execution of the method 200 goes on to a sixth step 220 of executing a production-related operation on the neural network 100 using the default clock frequency or, if applicable, the reduced clock frequency.

Steps 210, 212, 214, 216 and 218 can be executed in a dedicated configuration phase, in which case the predefined operation may be not production-related. Alternatively, the steps 210, 212, 214, 216 and 218 are performed at runtime, parallel to or overlapping with step 220, wherein the predefined operation may be production-related and contribute to a utility task. This alternative allows adjustments of the hardware accelerator's 318 clock frequency to be made at runtime ('on the fly').

In a further embodiment of the method 200, it further includes recording 214 a performance indicator while, for a given clock frequency, the predefined operation is executed 212/212.1 at two or more different values of a drive voltage to the hardware accelerator 318. The recording 214 may be repeated for a further clock frequency, so that a data table is obtained. The performance indicator may be an execution time in physical time units (seconds). Alternatively, the performance indicator may be a throughput (number of useful operations per unit time) per unit power supplied. In this further embodiment of the method 200, the drive-voltage values are compared with respect to the recorded performance values as part of step 216. The most economical drive-voltage value achieving a certain performance may be selected for use in production. Another conceivable selection rule is to use the highest drive-voltage value which produces a noticeable (relative or absolute) improvement over the next lower value, i.e., just before performance stagnates.

In an example where the performance indicator was the time to perform an inference using a 1024×576-pixel CNN and the default clock frequency of the hardware accelerator 318 was 600 MHz, the performance indicator values shown in Table 1 were recorded.

TABLE 1

Inference times recorded in step 214

|         | 0.75 V | 0.65 V |
|---------|--------|--------|
| 600 MHz | 50 ms  |        |
| 300 MHz | 91 ms  | 91 ms  |
| 200 MHz |        | 133 ms |

It is assumed that in step 216, first, the clock frequency of the hardware accelerator 318 is decided to be reduced to 300 MHz, to ensure sufficient cooling. Next, it is decided whether to use 0.75 or 0.65 V as drive voltage. On the basis of the data in Table 1, it is seen that no additional benefit is achieved by using the higher drive voltage, which suggests that the hardware accelerator 318 should be fed with 0.65 V. Put differently, the voltage 0.65 V is sufficient to drive the hardware accelerator 318 at this frequency and for the operations relating to the CNN under consideration.

It is noted that two inference times were recorded only for the 300 MHz clock frequency in the example. Recording multiple inference times also at 600 MHz and 200 MHz may be a futile effort if it is already clear from specifications that the higher and lower drive voltages, respectively, should be used. The inference times recorded at 600 MHz and 200 MHz may nevertheless be useful as a confirmation of the correctness of the inference times for 300 MHz. Indeed, the product of clock frequency and inference time—corresponding to the number of clock cycles which is typically proportional to the number of operations performed—is approximately constant throughout Table 1. This is the expected outcome since identical inferences were executed.

In another further embodiment of the method 200, which is combinable with the previous embodiment, the decision-making 218 is guided by a conversion factor. The conversion factor expresses the ratio of the power consumption of the predefined operation, which is executed in the measuring step 212, and the production-related operation to be executed in step 220. This extends the usefulness of the power consumption measurements obtained in a single execution of step 212, which can thus be used to configure the hardware accelerator 318 for a variety of neural networks 100 and the computational tasks related to these. The use of a conversion factor of this type also makes it less crucial for the predefined operation to resemble the production-related operation to be performed by the hardware accelerator 318 once deployed.

The conversion factor may be retrieved 218.1 from a memory co-localized with the hardware accelerator 318. In the example shown in FIG. 3, the conversion factor may be retrieved from the surveillance camera's 300 memory 314. The memory 314 is co-localized in this sense since the hardware accelerator 318 can access it directly, without any need to use a public communication network, such as the global Internet.

In some embodiments, step 218 includes selecting multiple conversion factors, corresponding to different building blocks from which the production-related operation is composed. The building blocks (or neural network backbones, or neural network architectures) may be selected from a pre-developed proprietary or standardized library, as discussed above. A building block in this sense may constitute a complete neural network, a sequence of layers of a neural network, a single layer of a neural network, a component within a layer of a neural network. A building block may represent a specified hardware instruction. Examples of publicly available building blocks include MobileNet-v2, Inception-v4, ResNet-50 and Inception-ResNet-v2.

A conversion factor $d^{(1)}$ of a first type may express a ratio of the building block's contribution $P_{bb}$ to the power consumption of the hardware accelerator 318 and the total power consumption $P_{tot}$ of the hardware accelerator 318 when executing the predefined operation:

$$d^{(1)} = \frac{P_{bb}}{P_{tot}},$$

$$P_{tot} = \sum_{k=1}^{n} P_k.$$

Alternatively or additionally, a conversion factor of a second type may be used which is a vector of subfactors $d^{(2)}=[d_1^{(2)} \ldots d_n^{(2)}]$, such that the building block's contribution $P_{bb}$ to the power consumption of the hardware accelerator 318 is given by:

$$P_{bb} = \sum_{k=1}^{n} d_k^{(2)} P_k.$$

Either way, the total power consumption of the production-related operation is obtained by summing over all its building blocks.

Figure 4:
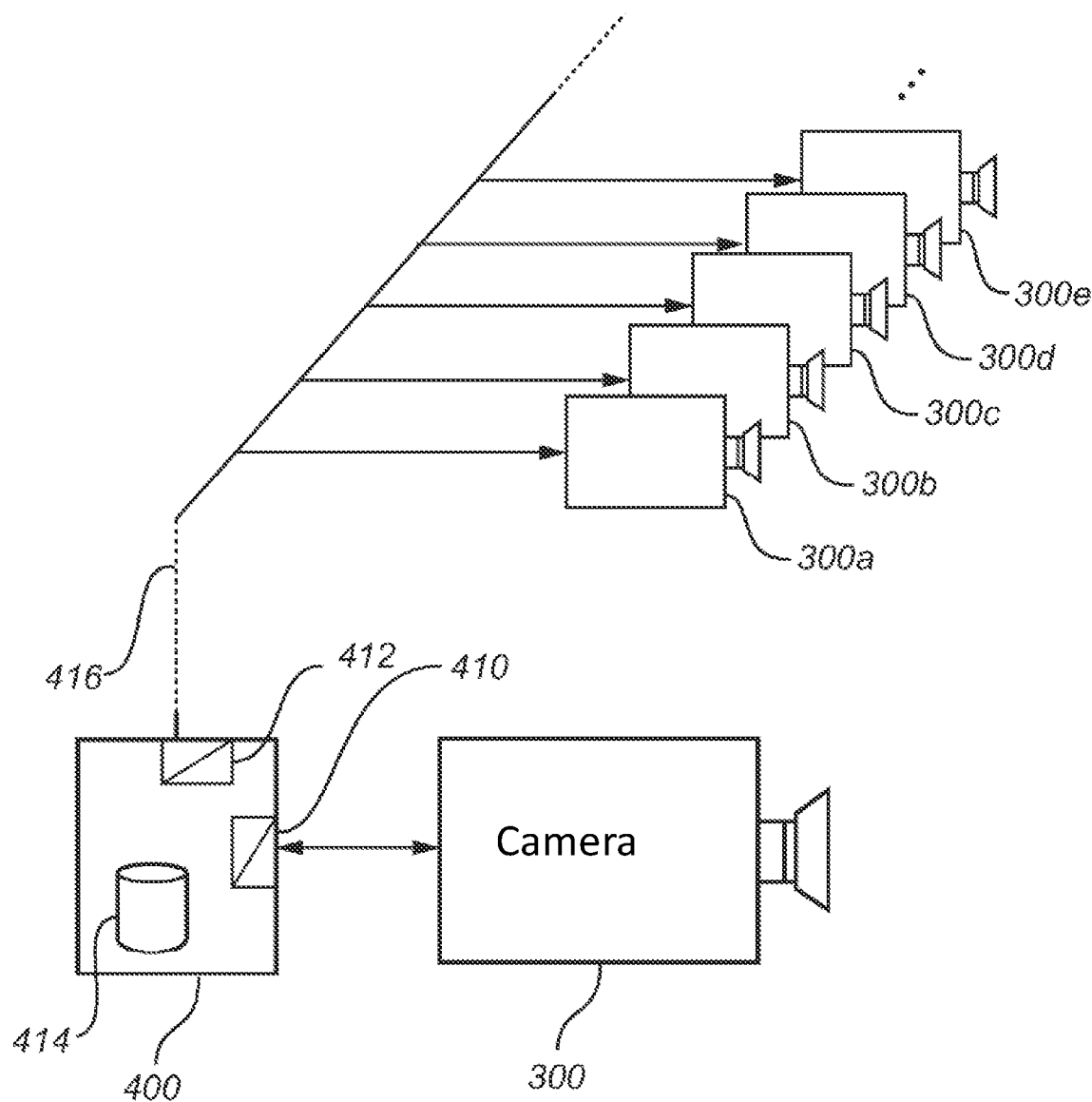
FIG. 4 illustrates aspects of configuring a surveillance camera in mass production.

FIG. 4 illustrates an advantageous way of loading the conversion factor data into the memory 314 during assembly or factory configuration of the surveillance camera 300. It is assumed that a large number of identical copies 300, 300a, 300b, ... of the surveillance camera are mass-produced. The hardware accelerator 318 in each surveillance camera 300 will implement an identical neural network 100 and will therefore be exposed to more or less equivalent computational loads. Variations may exist, on the one hand, if the image data from different scenes 399 involve different degrees of processing complexity and/or if there are noticeable variations between manufactured individual components of a given component model. On the other hand, and possibly more importantly from a quantitative point of view, the computational load may vary as a result of users configuring their surveillance cameras 300 to perform different functions, such as refinement, event detection, object detection etc. This can be handled by storing, locally in the memory 314 of each manufactured surveillance camera 300, a table of conversion factors, by which a decision may be reached quasi-instantaneously as to whether the default clock frequency can be used or an alternative lower clock frequency is more suitable. In terms of the method 200 discussed above, the decision-making 218 relating to the clock frequency can be completed without repeating the measuring step 212.

FIG. 4 shows a programming device 400, which may be a general-purpose computer, that is used for transferring the relevant data from a first copy 300 of the surveillance camera, on which measurements have been performed, into further copies 300a, 300b, ..... The programming device 400 has a first interface 410 for receiving, from the first copy 300, power consumption measurements $P_1, P_2, \ldots, P_{n-1}, P_n$ recorded for the predefined operation or equivalent information, such as conversion factors computed from these. A second interface 412 uploads conversion factors into the further copies 300a, 300b, ... over a data connection 416. The data connection 416 must be operable only during the final stages of assembly, such as a temporary wired connection. If the programming device 400 has received power consumption measurements $P_1, P_2, \ldots, P_{n-1}, P_n$ from the first copy 300, it computes the conversion factors to be uploaded. A memory 414 in the programming device 400 may store the information received from the first copy 300 and/or conversion factors computed by the programming device 400, so that receipt and uploading need not be synchronized in time.

The fact that each finished copy 300, 300a, 300b, ... of the surveillance camera includes a set of conversion factors allows it to adapt the clock frequency of its hardware accelerator 318. As a result, users can operate their cameras independently for significant stretches of time. The availability of the conversion factors in the memory 314 allows a user to utilize their camera for a different production-related operation without a need to obtain new configuration data from the manufacturer.

The aspects of the present disclosure have mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method of operating a hardware accelerator, the method comprising:
   implementing a multi-layer neural network using the hardware accelerator;
   measuring a power consumption of the hardware accelerator while executing a predefined operation on the multi-layer neural network at a default clock frequency;
   evaluating one or more power management criteria for the measured power consumption;
   in response to exceeding one of the power management criteria, reducing the clock frequency relative to the default clock frequency; and recording a performance indicator during the execution of the predefined operation for two or more drive-voltage values and at the same clock frequency,
wherein the evaluation includes comparing the drive-voltage values with respect to the recorded performance indicator.

2. The method of claim 1, wherein the measuring includes performing per-layer measurements which each relate to fewer than all layers of the neural network.

3. The method of claim 1, wherein the power management criteria include at least one of:
a global power budget on momentary power,
a global power budget on average power,
a per-layer momentary power limit,
a per-layer average power limit, and
a temperature limit.

4. The method of claim 1, further comprising:
measuring the power consumption while executing the predefined operation at an alternative, lower clock frequency.

5. The method of claim 1, wherein the performance indicator is one of:
an execution time in seconds, and
a throughput per unit power.

6. The method of claim 1, further comprising:
executing a production-related operation on the multi-layer neural network using the default clock frequency or, if applicable, the reduced clock frequency.

7. The method of claim 6, wherein said decision is made on the basis of a conversion factor relating the predefined operation and the production-related operation.

8. The method of claim 7, further comprising retrieving the conversion factor from a memory co-localized with the hardware accelerator.

9. The method of claim 1, wherein the predefined operation executing during the measuring is not production-related.

10. The method of claim 1, wherein the predefined operation executing during the measuring is production-related.

11. The method of claim 6, wherein the production-related operation is related to video surveillance.

12. The method of claim 1, wherein the hardware accelerator is specified for continuous operation at the default clock frequency, such as the greatest frequency at which the hardware accelerator is specified for continuous operation.

13. The method of claim 1, wherein the neural network is a convolutional neural network, CNN.

14. A processor configured to control a hardware accelerator, comprising:
a memory; and
processing circuitry configured to perform a method of operating a hardware accelerator, the method comprising:
implementing a multi-layer neural network using the hardware accelerator;
measuring a power consumption of the hardware accelerator while executing a predefined operation on the multi-layer neural network at a default clock frequency;
evaluating one or more power management criteria for the measured power consumption;
in response to exceeding one of the power management criteria, reducing the clock frequency relative to the default clock frequency; and
recording a performance indicator during the execution of the predefined operation for two or more drive-voltage values and at the same clock frequency,
wherein the evaluation includes comparing the drive-voltage values with respect to the recorded performance indicator.

\* \* \* \* \*